(12) United States Patent
Saito et al.

(10) Patent No.: US 12,482,822 B2
(45) Date of Patent: Nov. 25, 2025

(54) SECONDARY BATTERY ELECTRODE BINDER, SECONDARY BATTERY ELECTRODE MIXTURE LAYER COMPOSITION, SECONDARY BATTERY ELECTRODE AND SECONDARY BATTERY

(71) Applicant: TOAGOSEI CO., LTD., Tokyo (JP)

(72) Inventors: Naohiko Saito, Nagoya (JP); Tomoko Nakano, Nagoya (JP); Ayano Higasayama, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 754 days.

(21) Appl. No.: 17/767,988

(22) PCT Filed: Oct. 2, 2020

(86) PCT No.: PCT/JP2020/037497
§ 371 (c)(1),
(2) Date: Apr. 11, 2022

(87) PCT Pub. No.: WO2021/070738
PCT Pub. Date: Apr. 15, 2021

(65) Prior Publication Data
US 2024/0105948 A1 Mar. 28, 2024

(30) Foreign Application Priority Data
Oct. 11, 2019 (JP) .................. 2019-187584

(51) Int. Cl.
*H01M 4/62* (2006.01)
*H01M 4/04* (2006.01)
*H01M 10/052* (2010.01)

(52) U.S. Cl.
CPC ......... *H01M 4/622* (2013.01); *H01M 4/0404* (2013.01); *H01M 10/052* (2013.01)

(58) Field of Classification Search
CPC .................................................... H01M 4/622
See application file for complete search history.

(56) References Cited

U.S. PATENT DOCUMENTS 10,224,549 B2 * 3/2019 Sasaki ..................... C08L 25/10
11,177,478 B2 * 11/2021 Matsuzaki ............ C08F 220/18
(Continued)

FOREIGN PATENT DOCUMENTS

| CN | 105940457 A | 9/2016 |
| CN | 107004859 A | 8/2017 |

(Continued)

OTHER PUBLICATIONS

Jun. 11, 2024 Search Report issued in European Patent Application No. 20874102.5.
(Continued)

*Primary Examiner* — Amanda C. Walke
(74) *Attorney, Agent, or Firm* — Oliff PLC

(57) ABSTRACT

A secondary battery electrode binder that exhibits superior binding capacity. The present invention also provides a secondary battery electrode mixture layer composition, a secondary battery electrode, and a secondary battery that are obtained using the binder. The present invention relates to a secondary battery electrode binder that contains a carboxyl-group-containing polymer or a salt of a carboxyl-group-containing polymer. The carboxyl-group-containing polymer or salt of a carboxyl-group-containing polymer includes structural units that are derived from monomers that are represented by general formula (1) and structural units that are derived from ethylenic unsaturated carboxylic acid monomers that are different from general formula (1). The structural units derived from monomers that are represented by general formula (1) are 0.1-20 mass % of the total (Continued)

structural units of the carboxyl-group-containing polymer or salt of a carboxyl-group-containing polymer.

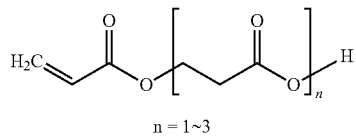

$$n = 1\sim3 \tag{1}$$

16 Claims, 1 Drawing Sheet

(56) References Cited

U.S. PATENT DOCUMENTS

| 11,870,076 | B2 * | 1/2024 | Saito ............... C08F 8/14 |
| 2007/0225522 | A1 | 9/2007 | Kobayashi et al. |
| 2013/0190410 | A1 | 7/2013 | Braun et al. |
| 2014/0087250 | A1 * | 3/2014 | Coowar ............... H01M 4/04 |
| | | | 252/511 |
| 2015/0287993 | A1 | 10/2015 | Komaba et al. |
| 2016/0156024 | A1 | 6/2016 | Kinpara et al. |
| 2016/0336613 | A1 | 11/2016 | Mochizuki et al. |
| 2017/0244095 | A1 | 8/2017 | Sonobe et al. |
| 2017/0309916 | A1 | 10/2017 | Toyoda et al. |
| 2017/0352886 | A1 | 12/2017 | Matsuzaki et al. |
| 2018/0034101 | A1 | 2/2018 | Lee et al. |
| 2018/0102542 | A1 | 4/2018 | Matsuzaki et al. |
| 2018/0138508 | A1 | 5/2018 | Komaba et al. |
| 2020/0235425 | A1 | 7/2020 | Mochizuki et al. |
| 2020/0335791 | A1 | 10/2020 | Saito et al. |

FOREIGN PATENT DOCUMENTS

| CN | 107534150 A | | 1/2018 | |
| JP | 2013065493 A | * | 4/2013 | |
| JP | 2013-145763 A | | 7/2013 | |
| JP | 2013-152955 A | | 8/2013 | |
| JP | 2013-161538 A | | 8/2013 | |
| JP | 2015-164125 A | | 9/2015 | |
| TW | 201349647 A | * | 12/2013 | ............ H01M 4/622 |
| WO | WO-2012111564 A1 | * | 8/2012 | ............ C08F 12/30 |
| WO | 2014/065407 A1 | | 5/2014 | |
| WO | 2014/207967 A1 | | 12/2014 | |
| WO | 2015/115561 A1 | | 8/2015 | |
| WO | 2016/067633 A1 | | 5/2016 | |
| WO | 2016/084364 A1 | | 6/2016 | |
| WO | 2016/171028 A1 | | 10/2016 | |
| WO | 2017/073589 A1 | | 5/2017 | |
| WO | WO-2018043484 A1 | * | 3/2018 | ............ C08F 220/06 |
| WO | 2018/092676 A1 | | 5/2018 | |
| WO | 2019/082867 A1 | | 5/2019 | |
| WO | 2019/098009 A1 | | 5/2019 | |

OTHER PUBLICATIONS

Dec. 22, 2020 International Search Report issued in International Patent Application No. PCT/JP2020/037497.
Dec. 22, 2020 Written Opinion of the International Searching Authority issued in International Patent Application No. PCT/JP2020/037497.
Mar. 2, 2024 Office Action issued in Chinese Patent Application No. 202080071240.4.
Sep. 28, 2023 Office Action issued in Chinese Patent Application No. 202080071240.4.
Apr. 28, 2023 Office Action issued in Chinese Patent Application No. 202080071240.4.
Jul. 2, 2025 Office Action issued in Korean Patent Application No. 10-2022-7012852.

* cited by examiner

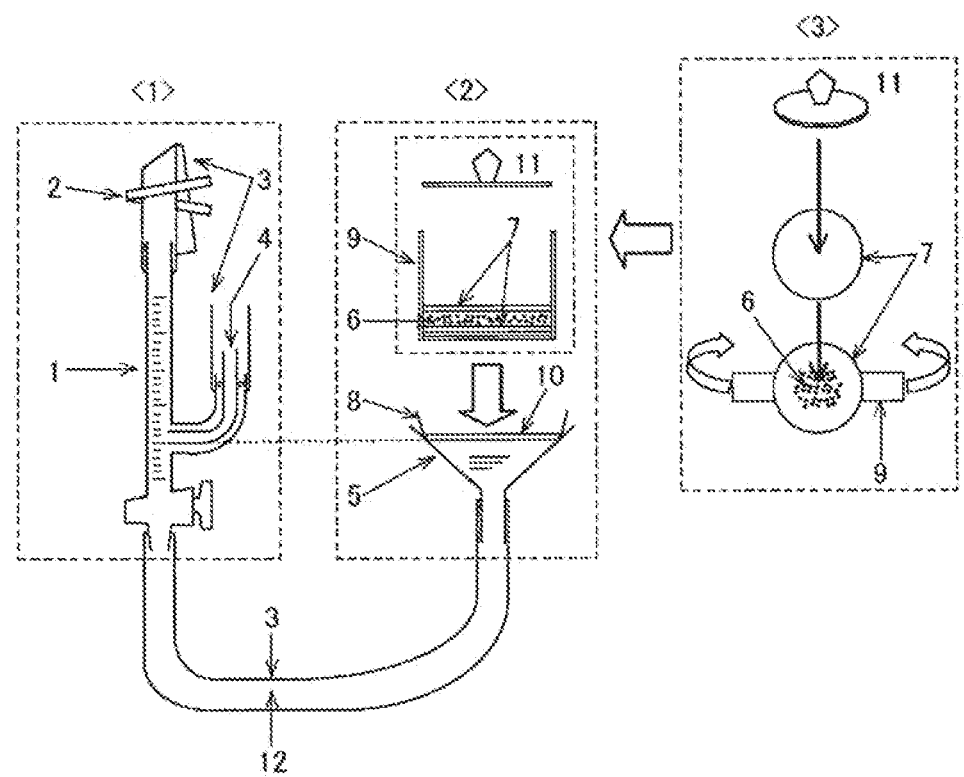

SECONDARY BATTERY ELECTRODE BINDER, SECONDARY BATTERY ELECTRODE MIXTURE LAYER COMPOSITION, SECONDARY BATTERY ELECTRODE AND SECONDARY BATTERY

TECHNICAL FIELD

The present invention relates to a secondary battery electrode binder, to a secondary battery electrode mixture layer composition, and to a secondary battery electrode and a secondary battery.

BACKGROUND ART

Various power storage devices such as nickel-hydrogen secondary batteries, lithium-ion secondary batteries and electric double-layer capacitors are in practical use as secondary batteries. To prepare electrodes for use in such secondary batteries, a composition containing an active material, a binder and the like for forming an electrode mixture layer is coated and dried and the like on a capacitor. In the case of lithium-ion secondary batteries for example, water-based binders containing styrene-butadiene rubber (SBR) latex and carboxymethyl cellulose (CMC) are used as binders in negative electrode mixture layer compositions. On the other hand, N-methyl-2-pyrrolidone (NMP) solutions of polyvinylidene fluoride (PVDF) are widely used as binders in positive electrode mixture layers.

Meanwhile, demands for greater energy density, reliability and durability tend to increase as various secondary batteries are used for an expanding range of applications. For example, specifications using silicon-based active materials as negative electrode active materials are becoming more popular for the purpose of increasing the electric capacity of lithium-ion secondary batteries. However, silicon-based active materials are known to undergo large volume changes during charge and discharge, causing peeling, detachment and the like of the electrode mixture layer after repeated use, and leading to decreased battery capacity and reduced cycle characteristics (durability). In general, an effective approach of controlling such problems is to bind the active materials together strongly with a binder (binding ability), and improvements in the binding ability of binders are being studied with the aim of improving durability.

Under these circumstances, there have been recent reports on the effectiveness of acrylic acid polymers as binders for use in negative electrode mixture layers containing silicon-based active materials. For example, an acrylic acid polymer crosslinked with a specific crosslinking agent is disclosed in Patent Literature 1 as a binder for forming a negative electrode coating of a lithium-ion secondary battery. Patent Literature 2 discloses a water-based electrode binder for a secondary battery, containing a water-soluble polymer having a structural unit derived from an ethylenically unsaturated carboxylic acid salt monomer and a structural unit derived from a vinyl alcohol monomer. Patent Literature 3 discloses a water-based electrode binder for a secondary battery, containing a water-soluble polymer having a structural unit derived from an ethylenically unsaturated carboxylic acid salt monomer and a structural unit derived from a highly hydrophilic ethylenically unsaturated monomer containing no carboxylic acid. Patent Literature 4 discloses a crosslinked acrylic acid polymer having a specific particle size in a 1% aqueous NaCl solution.

CITATION LIST

Patent Literature

| [Patent Literature 1] | WO 2014/065407 |
| [Patent Literature 2] | WO 2014/207967 |
| [Patent Literature 3] | WO 2016/067633 |
| [Patent Literature 4] | WO 2017/073589 |

SUMMARY OF INVENTION

Technical Problem

Although the binders disclosed in Patent Literature 1 to 4 can all impart favorable binding ability, demands for binders with greater binding strength continue to increase as secondary battery performance improves. Furthermore, secondary battery electrodes are generally obtained by coating and drying an electrode mixture layer composition (hereunder sometimes called an "electrode slurry") containing an active material and a binder on the surface of an electrode collector. In this context, an effective approach of increasing the drying efficiency of the electrode slurry and improving electrode productivity is to increase the concentration of the active material in the electrode mixture layer composition. However, in general it becomes difficult to ensure favorable coating properties because the viscosity of the electrode slurry increases as the active material concentration increases. Under these circumstances, although the binding ability of the acrylic acid polymers is increased by fine crosslinking in the binders described in Patent Literature 1 to 4, the fine crosslinking also causes increased expansion in water, and it has been difficult to increase the active material concentration because the viscosity increases greatly even with a small amount of the binder.

In light of these circumstances, it is an object of the present invention to provide a second battery electrode binder that can demonstrate better binding ability than in the past while also making it possible to reduce electrode slurry viscosity even when the electrode mixture layer composition has a high active material concentration, and moreover a secondary battery electrode mixture layer composition, a secondary battery electrode and a secondary battery are also provided.

Solution to Technical Problem

The inventors perfected the present invention as a result of diligent research aimed at solving these problems and discovering that by including specific amounts of specific structural units in a carboxyl group-containing polymer, it is possible to achieve better binding ability than in the past while also reducing the electrode slurry viscosity even when the electrode mixture layer composition has a high active material concentration.

The present invention is as follows.

[1] A secondary battery electrode binder comprising a carboxyl group-containing polymer or salt thereof, wherein
the carboxyl group-containing polymer or salt thereof contains a structural unit derived from a monomer represented by general formula (1) and a structural unit derived from an ethylenically unsaturated carboxylic acid monomer not represented by general formula (1), and the structural unit derived from the monomer represented by general formula (1) is contained in an amount of from 0.1 mass % to 20 mass % of total structural units of the carboxyl group-containing polymer or salt thereof:

[C1]

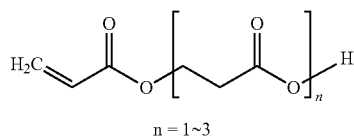

(1)

n = 1~3

[2] The secondary battery electrode binder according to [1], wherein the structural unit derived from an ethylenically unsaturated carboxylic acid monomer not represented by general formula (1) is contained in an amount of from 50 mass % to 99.9 mass % of the total structural units of the carboxyl group-containing polymer or salt thereof.
[3] The secondary battery electrode binder according to [1] or [2], wherein the carboxyl group-containing polymer is a crosslinked polymer obtained by polymerizing a monomer composition containing a non-crosslinkable monomer and a crosslinkable monomer.
[4] The secondary battery electrode binder according to [3], wherein the crosslinkable monomer is used in an amount of from 0.1 mol % to 1.0 mol % of a total amount of the non-crosslinkable monomer.
[5] The secondary battery electrode binder according to [3] or [4], wherein a sol fraction of the crosslinked polymer is less than 40 mass %.
[6] The secondary battery electrode binder according to any one of [3] to [5], wherein a degree of water swelling of the crosslinked polymer at pH 8 is from 4.0 to 60. [7] The secondary battery electrode binder according to any one of [3] to [6], wherein the crosslinked polymer contains a compound having at least two allyl ether groups in the molecule.
[8] A secondary battery electrode mixture layer composition, comprising the secondary battery electrode binder according to any one of [1] to [7] together with an active material and water.
[9] A secondary battery electrode comprising an electrode mixture layer including the secondary battery electrode binder according to any one of [1] to [7] on a surface of a collector.
[10] A secondary battery comprising the secondary battery electrode according to [9].

Advantageous Effects of Invention

With the secondary battery electrode binder of the present invention, it is possible to achieve excellent binding ability while reducing electrode slurry viscosity even when the electrode mixture layer composition has a high active material concentration.

BRIEF DESCRIPTION OF DRAWINGS

FIG. 1 shows an apparatus used for measuring the degree of water swelling of a carboxyl group-containing polymer or salt thereof.

DESCRIPTION OF EMBODIMENTS

The secondary battery electrode binder of the present invention contains a carboxyl group-containing polymer or salt thereof and can be mixed with an active material and water to obtain a secondary battery electrode mixture layer composition. To obtain the effects of the present invention, the composition is preferably an electrode slurry in the form of a slurry that can be coated on a collector, but it is also adaptable to being prepared as a wet powder and pressed on the surface of a collector. The secondary battery electrode of the invention is obtained by forming an electrode mixture layer from the composition on the surface of a collector such as a copper foil, aluminum foil or the like.

The following provides detailed descriptions of each of the secondary battery electrode binder, the secondary battery electrode mixture layer composition, the secondary battery electrode and the secondary battery. In this Description, "(meth)acrylic" means acrylic and/or methacrylic, and "(meth)acrylate" means acrylate and/or methacrylate. A "(meth)acryloyl group" means an acryloyl group and/or a methacryloyl group.

<Binder>

The binder of the present invention contains a carboxyl group-containing polymer or salt thereof, and this carboxyl group-containing polymer has a structural unit derived from a monomer represented by general formula (1) above and a structural unit derived from an ethylenically unsaturated carboxylic acid monomer not represented by general formula (1).

<Structural Units of Carboxyl Group-Containing Polymer>
Structural Unit Derived from Monomer Represented by General Formula (1)

The carboxyl group-containing polymer (hereunder sometimes called "the polymer") contains a structural unit (hereunder sometimes called "component (a)") derived from a monomer represented by the general formula (1) above, and this component (a) is contained in the amount of from 0.1 mass % to 20 mass % of the total structural units of the carboxyl group-containing monomer or salt thereof.

Because the polymer contains this amount of the component (a), the electrode slurry viscosity can be reduced and good coating properties can be ensured even with a high concentration of the active material in the electrode mixture layer composition, and a binder containing this polymer can have excellent binding ability and excellent adhesiveness with the collector can be easily ensured. The minimum content may be at least 0.15 mass % for example, or at least 0.2 mass % for example, or at least 0.25 mass % for example, or at least 0.3 mass % for example. A minimum content of at least 0.1 mass % is preferable for obtaining good electrode slurry coating properties, binding ability and durability of the resulting electrode. The maximum content may be not more than 19 mass % for example, or not more than 18 mass % for example, or not more than 17 mass % for example, or not more than 16 mass % for example. An appropriate range can be obtained by combining these minimum and maximum values.

Structural Unit Derived from Ethylenically Unsaturated Carboxylic Acid Monomer not Represented by General Formula (1)

In addition to the component (a), the polymer has a structural unit (hereunder sometimes called "component (b)") derived from an ethylenically unsaturated carboxylic acid monomer not represented by general formula (1).

Including this component (b) in the polymer provides not only improved adhesiveness with the collector, but also excellent lithium ion desolvation effects and ion conductivity, resulting in an electrode with low resistance and excellent high-rate characteristics. Because this also imparts water swellability, moreover, it can increase the dispersion stability of the active material and the like in the electrode mixture layer composition.

The component (b) can be introduced into the polymer for example by polymerizing monomers including an ethylenically unsaturated carboxylic acid monomer not represented by the general formula (1). It can also be obtained by first (co)polymerizing and then hydrolyzing a (meth)acrylic acid ester monomer. Other methods include polymerizing (meth)acrylamide, (meth)acrylonitrile and the like and then treating with a strong alkali, or reacting an acid anhydride with a polymer having hydroxyl groups.

Examples of the ethylenically unsaturated carboxylic acid monomer not represented by the general formula (1) include (meth)acrylic acid, itaconic acid, crotonic acid, maleic acid and fumaric acid; (meth)acrylamido alkylcarboxylic acids such as (meth)acrylamidohexanoic acid and (meth)acrylamidododecanoic acid; and carboxyl group-containing ethylenically unsaturated monomers such as monohydroxyethyl succinate (meth)acrylate and ω-carboxycaprolactone mono(meth)acrylate, and (partially) alkali neutralized products of these, and one of these alone or a combination of two or more may be used. Of these, a compound having acryloyl groups as polymerizable functional groups is preferred because the rapid polymerization speed produces a polymer with a long primary chain length and a binder with good binding strength, and acrylic acid is especially preferred. A polymer with a high carboxyl group content can be obtained by using acrylic acid as an ethylenically saturated carboxylic acid monomer.

The content of the component (b) in the polymer is not particularly limited but may be from 10 mass % to 99.9 mass % of the total structural units of the polymer for example. By including this amount of the component (b), it is possible to reduce electrode slurry viscosity and ensure good coating properties while easily ensuring excellent adhesiveness on the collector. The minimum content is for example at least 20 mass %, or for example at least 30 mass %, or for example at least 40 mass %. A minimum content of at least 10 mass % is desirable for obtaining good electrode slurry coating properties, binding ability and durability of the resulting electrode. The minimum content may also be at least 50 mass %, or at least 60 mass %, or at least 70 mass %, or at least 80 mass %. The maximum content may be for example not more than 99 mass %, or not more than 98 mass %, or not more than 95 mass %, or not more than 90 mass %. An appropriate range may be determined by combining these minimum and maximum values.

Other Structural Units

In addition to the component (a) and the component (b), the polymer may also contain a structural unit (hereunder also called the "component (c)") derived from an ethylenically unsaturated monomer that is copolymerizable with these. Examples of the component (c) include structural units other than the component (a) and component (b) that are derived from monomers having ethylenically unsaturated groups, including for example structural units derived from ethylenically unsaturated monomer compounds having anionic groups other than carboxyl groups, such as sulfonic acid groups and phosphoric acid groups, and structural units derived from nonionic ethylenically unsaturated monomers and the like. These structural units can be introduced by copolymerizing monomers including an ethylenically unsaturated monomer compound having anionic groups other than carboxylic acid groups, such as sulfonic acid groups or phosphoric acid groups, or monomers including a nonionic ethylenically unsaturated monomer.

The ratio of the component (c) may be at least 0 mass % but not more than 89.9 mass % of the total structural units of the polymer. The ratio of the component (c) may also be at least 0.5 mass % and not more than 70 mass %, or at least 1 mass % and not more than 60 mass %, or at least 2 mass % and not more than 50 mass %, or at least 5 mass % and not more than 40 mass %, or at least 10 mass % and not more than 30 mass %. The range can be determined by combining these minimum and maximum values. When the component (c) is included in the amount of at least 1 mass % of the total structural units of the polymer, an improvement effect on lithium-ion conductivity can be expected because affinity for the electrolyte solution is improved.

Of those mentioned above, a structural unit derived from a nonionic ethylenically unsaturated monomer is preferred as the component (c) from the standpoint of obtaining an electrode with good bending resistance, and examples of such nonionic ethylenically unsaturated monomers include (meth)acrylamide and (meth)acrylamide derivatives, ethylenically unsaturated monomers containing alicyclic structures, and ethylenically unsaturated monomers containing hydroxyl groups and the like.

Examples of (meth)acrylamide derivatives include N-alkyl (meth)acrylamide compounds such as isopropyl (meth)acrylamide and t-butyl (meth)acrylamide; N-alkoxyalkyl (meth)acrylamide compounds such as N-n-butoxymethyl (meth)acrylamide and N-isobutoxymethyl meth(acrylamide); and N,N-dialkyl (meth)acrylamide compounds such as dimethyl (meth)acrylamide and diethyl (meth)acrylamide, and one of these alone or a combination of two or more may be used.

Examples of ethylenically unsaturated monomers containing alicyclic structures include (meth)acrylic acid cycloalkyl esters optionally having aliphatic substituents, such as cyclopentyl (meth)acrylate, cyclohexyl (meth)acrylate, methyl cyclohexyl (meth)acrylate, t-butyl cyclohexyl (meth)acrylate, cyclodecyl (meth)acrylate and cyclododecyl (meth)acrylate; and isobornyl (meth)acrylate, adamantyl (meth)acrylate, dicyclopentenyl (meth)acrylate, dicyclopentenyl oxyethyl (meth)acrylate, dicyclopentanyl (meth)acrylate and cycloalkyl polyalcohol mono(meth)acrylates such as cyclohexane dimethanol mono(meth)acrylate and cyclodecane dimethanol mono(meth)acrylate, and one of these alone or a combination of two or more may be used.

Examples of ethylenically unsaturated monomers containing hydroxyl groups include hydroxyethyl (meth)acrylate, hydroxypropyl (meth)acrylate and hydroxybutyl (meth)acrylate, and one of these alone or a combination of two or more may be used.

A meth(acrylic) acid ester may also be used as another nonionic ethylenically unsaturated monomer. Examples of (meth)acrylic acid esters include (meth)acrylic acid alkyl esters such as methyl (meth)acrylate, ethyl (meth)acrylate, butyl (meth)acrylate, isobutyl (meth)acrylate and 2-ethylhexyl (meth)acrylate; (meth)acrylic acid alkyl ester compounds such as phenyl (meth)acrylate, phenylmethyl (meth)acrylate and phenylethyl (meth)acrylate; and (meth)acrylic acid alkoxyalkyl ester compounds such as 2-methoxyethyl (meth)acrylate and ethoxyethyl (meth)acrylate, and one of these alone or a combination of two or more may be used.

To obtain a binder with excellent binding ability, the polymer or salt thereof preferably contains a structural unit derived from (meth)acrylamide or a (meth)acrylamide derivatives or an ethylenically unsaturated monomer containing an alicyclic structure or the like. Furthermore, strong interactions with the electrode material and good binding with the active material can be achieved if a structural unit derived from a hydrophobic ethylenically unsaturated monomer with a solubility of not more than 1 g/100 ml in water is introduced as the component (c). An ethylenically unsaturated monomer containing an alicyclic structure is especially desirable as the "hydrophobic ethylenically unsaturated monomer with a solubility of not more than 1 g/100 ml in water" because it can yield a solid and highly integrated electrode mixture layer.

To improve the cycle characteristics of the resulting secondary battery, the polymer or salt thereof preferably contains a structural unit derived from an ethylenically unsaturated monomer containing hydroxyl groups, and this structural unit is preferably contained in the amount of at least 0.5 mass % but not more than 70 mass %, or more preferably at least 2.0 mass % but not more than 50 mass %, or still more preferably at least 10.0 mass % but not more than 50 mass %.

Of the non-ionic ethylenically unsaturated monomers, a compound having an acryloyl group is preferable because the polymerization rate is faster, resulting in a polymer with a long primary chain length and a binder with good binding ability.

The polymer may also be a salt. The type of salt is not particularly limited, and examples include alkali metal salts such as lithium salts, sodium salts and potassium salts; alkali earth metal salts such as magnesium salts, calcium salts and barium salts; other metal salts such as aluminum salts; and ammonium salts, organic amine salts and the like. Of these, the alkali metal salts and magnesium salts are preferred because they are unlikely to adversely affect the battery characteristics, and an alkali metal salt is more preferred. A lithium salt is especially desirable for obtaining a low-resistance battery.

<Preferred Embodiments of Polymer>

The carboxyl group-containing polymer of the present invention is preferably a crosslinked polymer (hereunder sometimes called simply the "crosslinked polymer") from the standpoint of ensuring good electrode slurry coating properties and further improving the binding performance even when a binder containing the polymer has a high active material concentration. The method for crosslinking the crosslinked polymer is not particularly limited, and examples include embodiments using the following methods.

1) Copolymerization of a crosslinkable monomer
2) Chain transfer to the polymer chain during radical polymerization
3) Crosslinking following synthesis of a polymer having reactive functional groups, and after addition of a crosslinking agent as necessary.

When the polymer has a crosslinked structure, a binder containing the polymer or its salt can have excellent binding strength. Of the above, the method using copolymerization of a crosslinkable monomer is preferred for ease of controlling the degree of crosslinking.

<Crosslinkable Monomer>

Examples of crosslinkable monomers include polyfunctional polymerizable monomers having two or more polymerizable unsaturated groups, and monomers having self-crosslinkable functional groups such as hydrolyzable silyl groups and the like.

The polyfunctional polymerizable monomers are compounds having two or more polymerizable functional groups such as (meth)acryloyl or alkenyl groups in the molecule, and examples include polyfunctional (meth)acrylate compounds, polyfunctional alkenyl compounds, and compounds having both (meth)acryloyl and alkenyl groups and the like.

One of these compounds may be used alone, or a combination of two or more may be used. Of these, a polyfunctional alkenyl compound is preferable for ease of obtaining a uniform crosslinked structure, and a polyfunctional allyl ether compound having two or more allyl ether groups in the molecule is especially preferable.

Examples of polyfunctional (meth)acrylate compounds include di(meth)acrylates of dihydric alcohols, such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; tri(meth)acrylates of trihydric and higher polyhydric alcohols, such as trimethylolpropane tri(meth)acrylate, trimethylolpropane ethylene oxide modified tri(meth)acrylate, glycerin tri(meth)acrylate, pentaerythritol tri(meth)acrylate and pentaerythritol tetra(meth)acrylate; poly(meth)acrylates such as tetra(meth)acrylate and bisamides such as methylene bisacrylamide and hydroxyethylene bisacrylamide and the like.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds having both (meth)acryloyl and alkenyl groups include allyl (meth)acrylate, isopropenyl (meth)acrylate, butenyl (meth)acrylate, pentenyl (meth)acrylate and 2-(2-vinyloxyethoxy)ethyl (meth)acrylate and the like.

Specific examples of the monomers having self-crosslinkable functional groups include vinyl monomers containing hydrolysable silyl groups, and N-methylol (meth)acrylamide, N-methoxyalkyl (meth)acrylamide and the like. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether; and vinyl esters containing silyl groups, such as vinyl trimethoxysilyl undecanoate and the like.

When the crosslinked polymer has been crosslinked with a crosslinkable monomer, the amount of the crosslinkable monomer used is preferably from 0.010 to 3.0 mol %, or more preferably from 0.050 to 2.0 mol %, or still more preferably, from 0.10 to 1.5 mol %, or yet more preferably from 0.20 to 1.0 mol % of the total amount of the monomers (non-crosslinkable monomers) other than the crosslinkable monomer. Using the crosslinkable monomer in the amount of at least 0.01 mol % is desirable for obtaining better binding ability and stability of the electrode slurry. Using not more than 3.0 mol % is desirable for obtaining good binding ability.

The amount of the crosslinkable monomer used is preferably from 0.05 to 5.0 mass %, or more preferably from 0.10 to 3.0 mass %, or still more preferably from 0.20 to 2.5 mass %, or yet more preferably from 0.30 to 2.0 mass % of the total constituent monomers of the crosslinked polymer.
<Sol Fraction of Crosslinked Polymer>

The sol fraction of the crosslinked polymer or salt thereof is preferably less than 40 mass %. With this sol fraction, it is possible to obtain an electrode exhibiting excellent binding ability, as well as an excellent improvement effect on the cycle characteristics of a secondary battery containing the electrode. The minimum value of the sol fraction may be at least 0.1 mass %, or at least 0.2 mass %, or at least 0.5 mass %, or at least 1.0 mass %. The maximum value of the sol fraction may also be 35 mass % or less, or 30 mass % or less, or 25 mass % or less, or 20 mass % or less, or 15 mass % or less.

The sol fraction in this Description is primarily composed of polymer lacking a three-dimensional crosslinked structure, and the sol fraction contained in the crosslinked polymer or salt thereof can be adjusted by known methods. That is, the sol fraction can be set within the desired range by adjusting the type and amount of a crosslinking agent used, the primary chain length of the polymer and the like. For example, the sol fraction is generally reduced by increasing the amount of the crosslinking agent or increasing the primary chain length.
<Weight-Average Molecular Weight of Sol Component of Crosslinked Polymer>

The weight-average molecular weight of the sol component of the crosslinked polymer or salt thereof is preferably not more than 300,000 (polyethylene oxide/polyethylene glycol conversion value). More preferably it is not more than 200,000, or still more preferably not more than 150,000, or yet more preferably not more than 100,000. With this weight-average molecular weight of the sol fraction, it is possible to obtain an electrode slurry with excellent coating properties and an electrode exhibiting excellent binding ability, as well as excellent effects in terms of improving the cycle characteristics of a secondary battery containing the electrode. The minimum value of the weight-average molecular weight of the sol fraction may be at least 1,000, or at least 2,000, or at least 3,000, or at least 5,000, or at least 10,000.

The weight-average molecular weight of the sol component of the crosslinked polymer is a polyethyelene oxide/polyethylene glycol conversion value.
<Particle Diameter of Crosslinked Polymer>

To obtain good binding performance with a binder containing the crosslinked polymer, preferably the crosslinked polymer is present in the electrode mixture layer composition not as large-diameter masses (secondary aggregations) but as well-dispersed water swollen particles of a suitable particle diameter.

Preferably when the crosslinked polymer or salt thereof of the invention with a degree of neutralization of 80 to 100 mol % based on the carboxyl groups of the crosslinked polymer is dispersed in water, the particle diameter (water swollen particle diameter) thereof is a volume-based median diameter in the range of from 0.1 to 10.0 microns. If the particle diameter is at least 0.1 but not more than 10.0 microns, the electrode mixture layer composition is highly stable and excellent binding ability can be achieved because the polymer is uniformly present at a suitable size in the electrode mixture layer composition. If the particle diameter exceeds 10.0 microns, binding ability may be insufficient as discussed above. There is also a risk that the coating properties may be inadequate because it is difficult to obtain a smooth coated surface. If the particle diameter is less than 0.1 microns, on the other hand, stable manufacturing may become a problem. The minimum value of the particle diameter may also be at least 0.2 microns, or at least 0.3 microns, or at least 0.5 microns. The maximum value of the particle diameter may also be not more than 9.0 microns, or not more than 8.0 microns, or not more than 7.0 microns, or not more than 5.0 microns, or not more than 3.0 microns. The range of the particle diameter may be determined by appropriately combining these minimum and maximum values and may be from 0.1 to 9.0 microns, or from 0.2 to 8.0 microns, or from 0.3 to 5.0 microns for example.

The water swelled particle diameter can be measured by the methods described in the examples of this Description.

When the crosslinked polymer is not neutralized or is neutralized to a degree of less than 80 mol %, the particle diameter may be measured after it has been neutralized to a degree of 80 to 100 mol % with an alkali metal hydroxide or the like and dispersed in water. In general, crosslinked polymers or their salts in a powder or solution (dispersion) state often exist as bulky particles formed by agglomeration and aggregation of primary particles. If the particle diameter is within the above range when dispersed in water, the crosslinked polymer or salt thereof has extremely good dispersibility, and bulky particles are broken up by being neutralized to a degree of 80 to 100 mol % and dispersed in water to form a stable dispersed state with a particle diameter in the range of from 0.1 to 10.0 microns consisting primarily of dispersed primary particles or secondary aggregates.

The particle size distribution is the value of the volume-average particle diameter divided by the number-average particle diameter of the water-swelled particles and is preferably not more than 10, or more preferably not more than 5.0, or still more preferably not more than 3.0, or yet more preferably not more than 1.5 from the standpoint of the binding ability and coating properties. The minimum value of the particle size distribution is normally 1.0.

The particle diameter of the crosslinked polymer or salt thereof of the present invention when dried (dried particle diameter) is preferably a volume-based median diameter in the range of from 0.03 to 3 microns. This particle diameter is more preferably in the range of from 0.1 to 1 micron, or still more preferably in the range of from 0.3 to 0.8 microns.

In the electrode mixture layer composition, the crosslinked polymer or salt thereof is preferably used in the form of a salt in which the acid groups such as carboxyl groups derived from the ethylenically unsaturated carboxylic acid monomer have been neutralized to a degree of neutralization of from 20 to 100 mol %. The degree of neutralization is preferably from 50 to 100 mol %, or more preferably from 60 to 95 mol %. A degree of neutralization of at least 20 mol % is desirable for obtaining good water swellability and a dispersion stabilization effect. In this Description, the degree of neutralization can be calculated from the charged values of the monomer having acid groups such as carboxyl groups and the neutralizing agent used for neutralization. The degree of neutralization can be confirmed from the intensity ratio of a peak derived from C=O groups of carboxylic acids and a peak derived from C=O groups of carboxylic acid salts in IR measurement of a powder obtained by drying the crosslinked polymer or salt thereof for 3 hours at 80° C. under reduced pressure.
<Molecular Weight (Primary Chain Length) of Crosslinked Polymer>

The crosslinked polymer has a three-dimensional crosslinked structure and exists as a microgel in media such as water. Because such a three-dimensional crosslinked polymer is normally insoluble in solvents, its molecular weight cannot be measured. Similarly, it is normally difficult to measure or assay the primary chain length of the crosslinked polymer.

<Degree of Water Swelling of Crosslinked Polymer>

In this Description, the degree of water swelling is calculated based on the following formula from the dried mass $[(W_A)g]$ of the crosslinked polymer or salt thereof and the mass $[(W_B)g]$ of the water absorbed when the crosslinked polymer or salt thereof is swelled to saturation with water.

$$(\text{Degree of water swelling}) = \{(W_A) + (W_B)\}/(W_A)$$

The degree of water swelling of the crosslinked polymer or salt thereof is preferably from 4.0 to 60 at pH 8. If the degree of water swelling is within this range, a sufficient adhesion area on the active material and the collector can be ensured when forming the electrode mixture layer and binding ability tends to be good because the crosslinked polymer or salt thereof swells appropriately in an aqueous medium. The degree of water swelling may also be at least 5.0, or at least 6.0, or at least 7.0, or at least 10, or at least 15 for example. If the degree of water swelling is at least 4.0, good binding ability is obtained because the crosslinked polymer or salt thereof spreads on the surface of the active material and collector, ensuring an adequate adhesion area. The maximum value of the degree of water swelling at pH 8 may be not more than 55, or 50, or 45, or 40, or 35. If the degree of water swelling exceeds 60, an electrode mixture layer composition (electrode slurry) containing the crosslinked polymer or salt thereof tends to have a high viscosity, and adequate binding force may not be obtained due to insufficient uniformity of the mixture layer. The coating properties of the electrode slurry may also decline. The range of the degree of water swelling at pH 8 may be determined by appropriately combining these maximum and minimum values, and may be from 5.0 to 60, or from 6.0 to 60, or from 5.0 to 55 for example.

The degree of water swelling at pH 8 can be determined by measuring the degree of water swelling of the crosslinked polymer or salt thereof in pH 8 water. Deionized water for example may be used as the pH 8 water, and the pH value may be adjusted as necessary with a suitable acid, alkali, buffer solution or the like. The pH during measurement is for example in the range of 8.0±0.5, or preferably in the range of 8.0±0.3, or more preferably in the range of 8.0±0.2, or still more preferably in the range of 8.0±0.1. Measurement is performed at 25±5° C.

A person skilled in the art can adjust the degree of water swelling by controlling the composition, structure and the like of the crosslinked polymer or salt thereof. For example, the degree of water swelling can be increased by introducing an acidic functional group or a highly hydrophilic structural unit into the crosslinked polymer. The degree of water swelling is also normally increased by reducing the degree of crosslinking of the crosslinked polymer.

<Method for Manufacturing Polymer or Salt Thereof>

A known polymerization method such as solution polymerization, precipitation polymerization, suspension polymerization or emulsion polymerization may be used for the polymer, but precipitation polymerization and suspension polymerization (reverse-phase suspension polymerization) are preferred from the standpoint of productivity. A heterogenous polymerization method such as precipitation polymerization, suspension polymerization or emulsion polymerization is preferred for obtaining good performance in terms of binding ability and the like, and a precipitation polymerization method is especially preferred.

Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, and a dispersion of secondary polymer particles is obtained, in which primary particles of tens of nanometers to hundreds of nanometers are aggregated to the secondary polymer particles of micrometers to tens of micrometers in size. A dispersion stabilizer may be used to control the particle size of the polymer.

Specific examples of dispersion stabilizers include dispersion stabilizers manufactured by living radical polymerization methods, macromonomer-type dispersion stabilizers, and nonionic surfactants and the like.

Such secondary aggregation can also be suppressed by selecting a dispersion stabilizer, a polymerization solvent and the like. In general, precipitation polymerization in which secondary aggregation is suppressed is also referred to as dispersion polymerization.

In a case of precipitation polymerization, the polymerization solvent may be selected from water and various organic solvents and the like depending on a type of monomer used and the like. To obtain a polymer with a longer primary chain length, it is desirable to use a solvent with a small chain transfer constant.

Specific examples of the polymerization solvents include water-soluble solvents such as methanol, t-butyl alcohol, acetone, methyl ethyl ketone, acetonitrile and tetrahydrofuran, and benzene, ethyl acetate, dichloroethane, n-hexane, cyclohexane and n-heptane and the like, and one of these or a combination of two or more may be used. Mixed solvents of any of these with water may also be used. In the present teachings, a water-soluble solvent means one having a solubility of more than 10 g/100 ml in water at 20° C.

Of these solvents, acetonitrile and methyl ethyl ketone are preferred because, for example, polymerization stability is good, with less production of coarse particles and adhesion to the reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because an operation is easier in a process neutralization described below.

It is also desirable to add a small amount of a highly polar solvent to the polymerization solvent in order to promote a stable and rapid neutralization reaction during the same process neutralization. Preferred examples of this highly polar solvent include water and methanol. The amount of the highly polar solvent used is preferably from 0.05 to 20.0 mass %, or more preferably from 0.1 to 10.0 mass %, or still more preferably from 0.1 to 5.0 mass %, or yet more preferably from 0.1 to 1.0 mass % based on the total mass of the medium. If the ratio of the highly polar solvent is at least 0.05 mass % it can have an effect on the neutralization reaction, while if the ratio is not more than 20.0 mass % there are no adverse effects on the polymerization reaction. When polymerizing a highly hydrophilic ethylenically unsaturated carboxylic acid monomer such as acrylic acid, moreover, adding a highly polar solvent serves to increase the polymerization speed, making it easier to obtain a polymer with a long primary chain length. Of the highly polar solvents, water is especially desirable for increasing the polymerization speed.

In manufacturing the polymer or salt thereof, it is desirable to include a polymerization step of polymerizing monomer components including a monomer represented by general formula (1) above and an ethylenically unsaturated carboxylic acid monomer not represented by general formula (1) above. For example, it is desirable to include a polymerization step of polymerizing monomer components including an ethylenically unsaturated carboxylic acid monomer for yielding the component (a) in the amount of from 0.1 mass % to 20 mass %/o and an ethylenically unsaturated monomer for yielding the component (b) in the amount of from 10 mass % to 99.9 mass % of the total As a result of this polymerization step, a structural component derived from the monomer represented by general formula (1) above (component (a)) is introduced into the crosslinked polymer in the amount of at least 0.1 mass % but not more than 20 mass %, and a structural unit derived from the ethylenically unsaturated carboxylic acid monomer not represented by general formula (1) above (component (b)) is introduced in the amount of at least but not more than 99.9 mass %.

The monomer represented by general formula (1) is used in the amount of for example at least 0.1 but not more than 19 mass %, or for example at least 0.1 but not more than 18 mass %, or for example at least 0.1 but not more than 17 mass %, or for example at least 0.1 but not more than 16 mass %.

The ethylenically unsaturated carboxylic acid monomer not represented by general formula (1) above is used in the amount of for example at least 20 but not more than 99.9 mass %, or for example at least 50 but not more than 99.9 mass %, or for example at least 60 but not more than 99.9 mass %, or for example at least 70 but not more than 99.9 mass %, or for example at least 80 but not more than 99.9 mass %.

Examples of the other ethylenically unsaturated monomer include ethylenically unsaturated monomer compounds having anionic groups other than carboxyl groups, such as sulfonic acid groups and phosphoric acid groups, and non-ionic ethylenically unsaturated monomers. Examples of specific compounds include monomer compounds capable of introducing the component (c) described above. This other ethylenically unsaturated monomer may constitutes at least 0 but not more than 89.9 mass %, or at least 0.5 but not more than 70 mass %, or at least 1 but not more than 60 mass %, or at least 5 but not more than 50 mass %, or at least 10 but not more than 30 mass % of the total amount of the monomer components. The above crosslinkable monomer may also be used similarly.

The monomer components that are polymerized in the polymerization step may also include a crosslinkable monomer. As discussed above, examples of crosslinkable monomers include polyfunctional polymerizable monomers having two or more polymerizable unsaturated groups, and monomers having self-crosslinking crosslinkable functional groups, such as hydrolytic silyl groups and the like.

The monomer concentration during polymerization is preferably high from the standpoint of obtaining a polymer with a long primary chain length. However, if the monomer concentration is too high the polymer particles are likely to aggregate, and it becomes difficult to control the polymerization heat, raising the risk of a runaway reaction. For example, in the case of precipitation polymerization the monomer composition at the beginning of polymerization is generally in the range of about 2 to 40 mass %, or preferably from 5 to 40 mass %.

In this Description, the "monomer concentration" is the concentration of monomers in the reaction solution at the polymerization initiation point.

The polymer may also be manufactured by performing a polymerization reaction in the presence of a basic compound. A stable polymerization reaction can be achieved even at a high monomer concentration by performing the polymerization reaction in the presence of a basic compound. The monomer concentration may be at least 13.0 mass %, or preferably at least 15.0 mass %, or more preferably at least 17.0 mass %, or still more preferably at least 19.0 mass %, or yet more preferably at least 20.0 mass %. Still more preferably the monomer concentration is at least 22.0 mass %, or yet more preferably at least 25.0 mass %. In general, the molecular weight can be increased by increasing the monomer concentration during polymerization, yielding a polymer with a long primary chain length. This also tends to reduce the sol fraction of the polymer because a polymer with a long primary chain length is likely to be incorporated into three-dimensional crosslinked structures.

The maximum value of the monomer concentration differs according to the monomers used, the type of solvent, the polymerization method and the various polymerization conditions and the like, but assuming that the polymerization reaction heat can be removed, the maximum value is generally about 40% in the case of precipitation polymerization as discussed above, or about 50% in the case of suspension polymerization, or about 70% in the case of emulsion polymerization.

The basic compound is a so-called alkali compound, and either an inorganic basic compound or an organic basic compound may be used. By performing a polymerization reaction in the presence of a basic compound, it is possible to achieve a stable polymerization reaction even with a high monomer concentration exceeding 13.0 mass % for example. Furthermore, a polymer obtained by polymerization at such a high monomer concentration has excellent binding ability due to having a high molecular weight (long primary chain length).

Examples of inorganic basic compounds include alkali metal hydroxides such as lithium hydroxide, sodium hydroxide and potassium hydroxide, alkali earth metal hydroxides such as calcium hydroxide and magnesium hydroxide, and alkali metal carbonates such as sodium carbonate, potassium carbonate and the like, and one or two or more of these may be used.

Examples of organic basic compounds include ammonia and organic amine compounds, and one or two or more of these may be used. Of these compounds, an organic amine compound is desirable considering polymerization stability and the binding ability of a binder containing the resulting crosslinked polymer or salt thereof.

Examples of organic amine compounds include N-alkyl substituted amines such as monomethylamine, dimethylamine, trimethylamine, monoethylamine, diethylamine, triethylamine, monobutylamine, dibutylamine, tributylamine, monohexylamine, dihexylamine, trihexylamine, trioctylamine and tridodecylamine; (alkyl) alkanolamines such as monoethanolamine, diethanolamine, triethanolamine, propanolamine, dimethylethanolamine and N,N-dimethylethanolamine; cyclic amines such as pyridine, piperidine, piperazine, 1,8-bis(dimethylamino)naphthalene, morpholine and diazabicycloundecene (DBU); and diethylene triamine and N,N-dimethylbenzylamine, and one or two or more of these may be used.

Of these, a hydrophobic amine having long-chain alkyl groups is desirable for ensuring polymerization stability even at a high monomer concentration because it yields greater static repulsion and steric repulsion. Specifically, the higher the value (C/N) of the ratio of the number of carbon atoms relative to the number of nitrogen atoms in the organic amine compound, the greater the polymerization stabilization effect due to steric repulsion. This C/N ratio is preferably at least 3, or more preferably at least 5, or still more preferably at least 10, or yet more preferably at least 20.

The amount of the basic compound used is preferably in the range of from 0.001 mol % to 4.0 mol % of the ethylenically unsaturated carboxylic acid monomer. If the amount of the basic compound is within this range, the polymerization reaction can progress smoothly. The amount used may also be from 0.05 to 4.0 mol %, or from 0.1 to 4.0 mol %, or from 0.1 to 3.0 mol %, or from 0.1 to 2.0 mol %.

In this Description, the amount of the basic compound is represented as the molar concentration of the basic compound relative to the ethylenically unsaturated carboxylic acid compound and does not signify the degree of neutralization. That is, the valence of the basic compound is not considered.

A known polymerization initiator such as an azo compound, organic peroxide or inorganic peroxide may be used as a polymerization initiator, without any particular restrictions. The conditions of use may be adjusted to achieve a suitable amount of radical generation, using a known method such as thermal initiation, redox initiation using a reducing agent, UV initiation or the like. To obtain a crosslinked polymer with a long primary chain length, the conditions are preferably set so as to reduce the amount of radical generation within the allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy)butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3,3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-peroxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas ($SO_2$), ferrous sulfate or the like can be used as the reducing agent.

Given 100 mass parts as the total amount of the monomer components used, the polymerization initiator is preferably used in the amount of from 0.001 to 2 mass parts, or from 0.005 to 1 mass part, or from 0.01 to 0.1 mass parts for example. If the amount of the polymerization initiator is at least 0.001 mass parts, a stable polymerization reaction can be achieved, while if it is not more than 2 mass parts it is easy to obtain a polymer with a long primary chain length.

The polymerization temperature depends on the types and concentrations of the monomers used and the like, but is preferably from 0 to 100° C., or more preferably from 20 to 80° C., and the polymerization temperature may be constant or may vary during the period of the polymerization reaction.

The polymer dispersion obtained through the polymerization step may be subjected to a drying step in which the solvent is removed by pressure reduction and/or heating treatment or the like to yield the target polymer in a powder form. In this case, the drying step is preferably preceded by a solid-liquid separation step by centrifugation, filtration or the like and a washing step using water, methanol or the same solvent as the polymerization solvent to remove unreacted monomers (and their salts) and impurities derived from the polymerization initiator and the like after the polymerization step. When such a washing step is included, the polymer breaks up more easily during use even when secondary aggregations have formed, and good performance in terms of binding ability and battery characteristics is also obtained because residual unreacted monomers are removed.

A polymerization reaction of a monomer composition containing a monomer represented by the general formula (1) and an ethylenically unsaturated carboxylic acid monomer not represented by the general formula (1) is performed in the presence of a basic compound in this manufacturing method, but the solvent may also be removed in a drying step after the polymer has been neutralized (hereunder sometimes called "process neutralization") by addition of an alkali compound to the polymer dispersion obtained in the polymerization step. Alternatively, a powder of the polymer may be obtained without such performing such process neutralization treatment, after which an alkali compound may be added when preparing the electrode slurry to neutralize the polymer (hereunder called "post-neutralization"). Of these, process neutralization is preferable because it tends to make the secondary aggregates easier to break up.

<Secondary Battery Electrode Mixture Layer Composition>

The secondary battery electrode mixture layer composition of the present invention contains a binder containing the polymer or a salt thereof, together with an active material and water.

The amount of the polymer or salt thereof used in the electrode mixture layer composition of the present invention is for example from 0.1 to 20 mass % of the total amount of the active material. This amount used may also be from 0.2 to 10 mass %, or from 0.3 to 8 mass %, or from 0.4 to 5 mass % for example. Adequate binding ability may not be obtained if the amount of the polymer or salt thereof is less than 0.1 mass %. The dispersion stability of the active material and the like may also be inadequate, and the formed mixture layer may be less uniform. If the mount of the polymer or salt thereof exceeds 20 mass %, on the other hand, the coating properties on the collector may decline because the electrode mixture layer composition is too viscous. The resulting mixture layer may have inclusions and irregularities as a result, adversely affecting the battery characteristics.

If the amount of the crosslinked polymer and salt thereof is within the aforementioned range, a composition with excellent dispersion stability can be obtained, and it is also possible to obtain a mixture layer with extremely high adhesiveness to the collector, resulting in improved battery durability. Moreover, because the polymer and salt thereof has sufficient ability to bind the active material even in a small quantity (such as 5 mass % or less), and because it has carboxy anions, it can yield an electrode with little interface resistance and excellent high-rate characteristics.

Of the active materials described above, lithium salts of transition metal oxides cab be used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_xCo_yMn_z), x+y+z=1\}$ and NCA $\{Li(Ni_{1-a-b}Co_aAl_b)\}$ and the like, which are referred to as ternary materials. Examples of spinel-type positive electrode active materials include lithium manganate and the like. Apart from oxides, phosphate salts, silicate salts and sulfur and the like may also be used. Examples of phosphate salts include olivine-type lithium iron phosphate and the like. One of these may be used alone as a positive electrode active material, or two or more may be combined and used as a mixture or composite.

When a positive electrode active material containing a laminar rock salt-type lithium-containing metal oxide is dispersed in water, the dispersion exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using an unneutralized or partially neutralized polymer as the binder. The amount of the unneutralized or partially neutralized polymer used is preferably such that the amount of unneutralized carboxyl groups in the polymer is equal to or more than the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferable to make it easier to obtain excellent conductivity. As the carbon black, ketjen black and acetylene black are preferable. One of these conductive aids may be used alone, or a combination of two or more may be used. The amount of the conductive aid used may be from 0.2 to 20 mass % or from 0.2 mass % of the total amount of the active material for example from the standpoint of achieving both conductivity and energy density. An electrode active material that has been surface coated with a carbon material having conductivity may also be used.

Examples of negative electrode active materials include carbon materials, lithium metal, lithium alloys, metal oxides and the like, and one of these or a combination of two or more may be used. Of these, an active material formed of a carbon material such as natural graphite, artificial graphite, hard carbon, and soft carbon (hereunder referred to as a "carbon-based active material") is preferred, and hard carbon or a graphite such as natural graphite or artificial graphite is more preferred. In the case of graphite, spherical graphite is preferred from the standpoint of battery performance, and the particle size thereof is preferably in the range of from 1 to 20 microns for example, or from 5 to 15 microns for example. To increase the energy density, metals, metal oxides or the like capable of occluding lithium, such as silicon and tin, may also be used as negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. Although these silicon-based active materials have high capacities, however, the volume change accompanying charging and discharging is large. Therefore, they are preferably used in combination with the aforementioned carbon-based active materials. In this case, the amount of the silicon active material used is preferably from 2 to 80% of the combined amount of the carbon active material and the silicon active material. The amount of the silicon active material used may also be from 5 to 70 mass %, or from 8 to 60 mass %, or from 10 to 50 mass %.

The polymer has a structural unit (component (a)) derived from a monomer represented by general formula (1) above and a structural unit (component (b)) derived from an ethylenically unsaturated carboxylic acid monomer not represented by general formula (1), and exhibits good binding ability because the component (a) and component (b) have strong affinity for silicon active materials. This is also considered effective for improving the durability of the electrode because the binder of the present invention exhibits excellent binding ability even when used with high-capacity type active materials including silicon active materials.

From the standpoint of suppressing or reducing an increase in the viscosity of the electrode slurry, the polymer is preferably a crosslinked polymer having a structural unit (component (c)) derived from a specific monomer having hydroxyl groups. The reason for this effect is not entirely clear, but it is thought that because the polymer has relatively flexible hydroxyl groups in the side chains, these interact with the carboxyl groups in the polymer to suppress swelling of the crosslinked polymer in water. However, this supposition does not limit the scope of the invention.

Because carbon active materials themselves have good electrical conductivity, it may not be necessary to add a conductive aid. When a conductive aid is added to improve the cycle characteristics or the like, the added amount is not more than 10 mass % or not more than 5 mass % for example of the total amount of the active materials from the standpoint of energy density.

When the secondary battery electrode mixture layer composition is in the form of a slurry, the amount of the active materials used is in the range of from 10 to 75 mass % of the total amount of the composition for example. If the amount of the active material is at least 10 mass %, migration of the binder and the like is suppressed. Because this is also useful for controlling medium drying costs, the amount of the active material is preferably at least 30 mass %, or more preferably at least 40 mass %, or still more preferably at least 50 mass %. If the amount is not more than 75 mass %, on the other hand, it is possible to ensure good flowability and coating properties of the composition and form a uniform mixture layer.

The secondary battery electrode mixture layer composition uses water as a medium. A mixed solvent of water with a lower alcohol such as methanol or ethanol, a carbonate such as ethylene carbonate, a ketone such as acetone, or a water-soluble organic solvent such as tetrahydrofuran or N-methylpyrrolidone may also be used to adjust the consistency, drying properties and the like of the composition. The percentage of water in the mixed solvent is at least 50 mass % for example or at least 70 mass % for example.

When the electrode mixture layer composition is in the form of a coatable slurry, the solids concentration thereof is not limited to about 50 mass %, and the content of the media including water in the composition as a whole may be in the range of from 25 to 90 mass %, or from 35 to 70 mass %, or from 45 to 70 mass % for example from considering the coating properties of the slurry, the energy costs required for drying and productivity.

The binder of the present invention may consist only of the polymer or salt thereof, but other binder components such as styrene/butadiene latex (SBR), acrylic latex and polyvinylidene fluoride latex may also be included. When another binder component is included, the amount used may be from 0.1 to 5 mass %, or from 0.1 to 2 mass %, or from 0.1 to 1 mass % for example of the active materials. If more than 5 mass % of the other binder component is used resistance may increase, resulting in inadequate high-rate characteristics. Of the above, styrene/butadiene latex is preferred for obtaining an excellent balance of binding ability and bending resistance.

This styrene-butadiene latex exists as an aqueous dispersion of a copolymer having a structural unit derived from an aromatic vinyl monomer such as styrene and a structural unit derived from an aliphatic conjugated diene monomer such as 1,3-butadiene. In addition to styrene, examples of the aromatic vinyl monomer include alpha-methylstyrene, vinyl toluene and divinyl benzene, and one or two or more of these may be used. Principally from the standpoint of binding ability, the structural unit derived from the aromatic vinyl monomer may constitute from 20 to 60 mass %, or for example from 30 to 50 mass % of the copolymer.

In addition to 1,3-butadiene, examples of the aliphatic conjugated diene monomer include 2-methyl-1,3-butadiene, 2,3-dimethyl-1,3-butadiene and 2-chloro-1,3-butadiene, and one or two or more of these may be used. Considering the binding ability of the binder and the flexibility of the resulting electrode, the structural unit derived from the aliphatic conjugated diene monomer may constitute from 30 to 70 mass % or for example from 40 to 60 mass % of the copolymer.

In addition to the above monomers, a nitrile-containing monomer such as (meth)acrylonitrile or a carboxyl group-containing monomer such as (meth)acrylic acid, itaconic acid or maleic acid may also be used as another copolymerized monomer in the styrene/butadiene latex in order to improve the binding ability and other performance.

The structural unit derived from this other monomer may constitute from 0 to 30 mass % or for example from 0 to 20 mass % of the copolymer.

The secondary battery electrode mixture layer composition of the present invention has the above active material, water and binder as essential components, and is obtained by mixing these components by known methods. The method for mixing the components is not particularly limited, and a known method may be adopted, but a method of first dry pressing the active material, a conductive aid, and other powder components including the polymer particle used as the binder, and mixing, dispersing and kneading this with a dispersion medium such as water is preferred. When the electrode mixture layer composition is obtained as a slurry, it is preferably made into an electrode slurry without dispersion defects or aggregations. A known mixer such as a planetary mixer, thin-film spinning mixer or self-rotating mixer may be used as the mixing means, but a thin-film spin mixer is preferred for obtaining a well dispersed state in a short amount of time. When using a thin-film spin mixer, it is desirable to first pre-disperse with an agitator such as a disperser. The viscosity of the slurry may be in the range of from 500 to 10,000 mPa·s for example. Considering the coating properties of the electrode slurry, the maximum viscosity is preferably not more than 7,000 mPa·s, or more preferably not more than 6,000 mPa·s, or still more preferably not more than 5,000 mPa·s, or yet more preferably not more than 4,000 mPa·s, or even more preferably not more than 3,000 mPa·s. The slurry viscosity can be measured at a liquid temperature of 25° C. by the methods described in the examples.

When the electrode mixture layer composition is obtained as a wet powder, it is preferably kneaded with a Henschel mixer, blender, planetary mixer or twin-screw kneader or the like to obtain a uniform state without concentration irregularities.

<Secondary Battery Electrode and Secondary Battery>

The secondary battery electrode of the present invention may be provided with a mixture layer formed from the electrode mixture layer composition of the invention on the surface of a collector made of copper, aluminum or the like. The mixture layer is formed by first coating the electrode mixture layer composition of the invention on the surface of the collector, and then drying to remove the water or other solvent. The method for coating the electrode mixture layer composition is not particularly limited, and a known method such as a doctor blade method, dip method, roll coating method, comma coating method, curtain coating method, gravure coating method or extrusion method may be adopted. Drying may also be accomplished by a known method such as hot air blowing, pressure reduction, (far) infrared irradiation, microwave irradiation or the like.

The mixture layer obtained after drying is normally subjected by pressing treatment with a metal press, roll press or the like. The active material and the binder are compacted together by pressing, which can improve the strength of the mixture layer and its adhesiveness with the collector. The thickness of the mixture layer may be adjusted by pressing to about 30% to 80% of the pre-pressed thickness, and the thickness of the mixture layer after pressing is normally about 4 to 200 microns.

A secondary battery can be prepared by providing a separator and an electrolyte solution with the secondary battery electrode of the invention. The electrolyte solution may be in the form of a liquid or a gel.

The separator is disposed between the positive and negative electrodes of the battery, and serves to prevent short-circuits due to contact between the electrodes, hold the electrolyte solution and ensure ion conductivity. The separator is preferably an insulating finely porous film, having good ion permeability and mechanical strength. Specific materials that can be used include polyolefins such as polyethylene and polypropylene, and polytetrafluoroethylene and the like.

A commonly used known electrolyte solution may be used according to the type of active material. In the case of a lithium-ion secondary battery, specific examples of solvents include cyclic carbonates with high dielectric constants and high electrolyte dissolution ability, such as propylene carbonate and ethylene carbonate, and low-viscosity linear carbonates such as ethyl methyl carbonate, dimethyl carbonate and diethyl carbonate, and these may be used alone or as mixed solvents. The electrolyte solution is used as a solution of a lithium salt such as $LiPF_6$, $LiSbF_6$, $LiBF_4$, $LiClO_4$ or $LiAlO_4$ dissolved in these solvents. In the case of a nickel-hydrogen secondary battery, a potassium hydroxide aqueous solution may be used as the electrolyte solution. To obtain secondary battery, a positive electrode plate and negative electrode plate are separated by separators, made into a wound or laminated structure, and enclosed in a case or the like.

As discussed above, the secondary battery electrode binder disclosed in this Description exhibits excellent binding ability with electrode materials in a mixture layer and excellent adhesiveness with a collector. Consequently, a secondary battery equipped with an electrode obtained using this binder is expected to provide good integrity and good durability (cycle characteristics) even after repeated charge and discharge, making it suitable as a secondary battery for automotive use.

EXAMPLES

The present invention is explained in detail below based on examples, but the present invention is not limited by these examples. Unless otherwise specified, "parts" and "%" indicate mass parts and mass % values.

In the following examples, the carboxyl group-containing polymers (salts) were evaluated by the following methods.

(1) Degree of Water Swelling at pH 8

The degree of water swelling at pH 8 was measured by the following methods. The measurement apparatus is shown in FIG. 1.

The measurement apparatus is composed of <1> to <3> in FIG. 1.

<1> Consisting of burette 1 with a branch pipe for bleeding air, pinch cock 2, silicon tube 3 and polytetrafluoroethylene tube 4.

<2> A strut cylinder 8 having several holes on the bottom is placed on top of a funnel 5, and an equipment filter paper 10 is disposed on top of the strut cylinder 8.

<3> A sample 6 (measurement material) of the carboxyl group-containing polymer or salt thereof is sandwiched between two sample-fixing filter papers 7, and the sample-fixing papers are fixed with adhesive tape 9. Advantec No. 2 with an internal diameter of 55 mm was used for all of the filter papers.

<1> and <2> are connected by silicon tube 3.

The heights of the funnel 5 and strut cylinder 8 are fixed relative to the burette 1, and the bottom end of the polytetrafluoroethylene tube 4 inside the burette branch pipe is set at the same height as the bottom surface of the strut cylinder 8 (dotted line in FIG. 1).

The measurement methods are explained below. Unless otherwise specified, the following operations were performed at 25° C.

The pinch cock 2 of <1> is removed, and deionized water adjusted to pH 8.0 is introduced from above the burette 1 through the silicon tube 3 so that the apparatus is filled with deionized water 12 from the burette 1 to the equipment filter paper 10. Pinch cock 2 is then shut, and air is removed from the polytetrafluoroethylene tube 4 connected by a rubber stopper to the burette branch pipe. This causes deionized water 12 to be continuously supplied from the burette 1 to the equipment filter paper 10.

The excess deionized water 12 seeping through the equipment filter paper 10 is then removed, and the scale reading (a) of the burette 1 is recorded.

0.1 to 0.2 g of a dried powder of the measurement sample is measured, and uniformly placed in the center of the sample-fixing filter paper 7 as shown in <3>. Another sheet of filter paper is placed on the sample, and the two sheets of filter paper are fastened with an adhesive tape 9 to fix the sample. The filter papers containing the fixed sample are then placed on the equipment filter paper 10 shown in <2>.

The equipment filter paper 10 is then covered with a lid 11, and the scale reading (b) of the burette 1 is recorded after 30 minutes.

The total (c) of the water absorption of the measurement sample and the water absorption of two sheets of the sample-fixing filter paper 7 is calculated as (a-b). Water absorption (d) is also measured using only two sheets of filter paper 7 without a sample of the carboxyl group-containing polymer or salt thereof.

These operations were performed, and the degree of water swelling was calculated by the following formula. The solids component used in calculation is a value measured by the methods described below.

Degree of water swelling={dry mass (g) of measurement sample+$(c-d)$}/{dry mass (g) of measurement sample)}

In the above, dry mass (g) of measurement sample=mass (g) of measurement sample×(solids component (%)÷100).

The method for measuring the solids component is explained below.

About 0.5 g of the sample is taken in a weighing bottle whose mass has been measured in advance [mass of weighing bottle=B (g)], and accurately weighed together with the weighing bottle [$W_0$ (g)], after which the sample together with the bottle is contained in a windless dryer and dried for 45 minutes at 155° C., the mass at that point is measured together with the weighing bottle [$W_1$ (g)], and the solids component is calculated by the following formula.

Solids component (%)=$(W_1-B)/(W_0-B)\times100$ (2) Measuring Sol Fraction

An aqueous dispersion of the carboxyl group-containing polymer (salt) was prepared with a concentration of 0.5 mass % and centrifuged for 30 minutes at 4,000 rpm, after which the supernatant was collected. This supernatant was diluted 15 times with deionized water to obtain a measurement sample. The Li (or Na, or K) concentration in the measurement sample was measured by ICP spectroscopy (ICAP 7600, Thermo Fischer Scientific).

The sol fraction was then calculated by the following formula based on the ratio of the Li (or Na, or K) concentration [$M_2$ (ppm)] in the measurement sample to the Li (or Na, or K) concentration [$M_1$ (ppm)] as calculated from the charged values shown in Table 1.

Sol fraction (%)=$M_2/M_1$×100

<Manufacturing Carboxyl Group-Containing Polymer Salt>

Manufacturing Example 1: Manufacture of Carboxyl Group-Containing Polymer Salt R-1

A reactor equipped with a stirring blade, a thermometer, a reflux condenser and a nitrogen inlet pipe. 567 parts of acetonitrile, 2.20 parts of deionized water, 90.0 parts of acrylic acid (hereunder called "AA"), 10.0 parts of beta-carboxyethyl acrylate (hereunder called "CEAA"), 0.2 parts of trimethylol propane diallyl ether (Daiso, product name Neoallyl T-20), and triethylamine in the amount of 1.0 mol % of the AA were loaded into a reactor. The reactor was thoroughly purged with nitrogen, and heated to an internal temperature of 55° C. Once the internal temperature was confirmed to have stabilized at 55° C., 0.040 parts of 2,2'-azobis(2,4-dimethylvaleronitrile) (Wako Pure Chemical, product name V-65) were added as a polymerization initiator, and this was taken as the polymerization initiation point because white turbidity was observed in the reaction solution. The monomer concentration was calculated to be 15.0%. 12 hours after the polymerization initiation point, cooling of the reaction solution was initiated, and once the internal temperature had fallen to 25° C., 49.8 parts of lithium hydroxide monohydrate (hereunder called LiOH·$H_2O$) were added. After addition the mixture was stirred continuously for 12 hours at room temperature to obtain polymerization reaction solution in the form of a slurry comprising particles of a carboxyl group-containing polymer salt R-1 (Li salt, degree of neutralization 90 mol %) dispersed in a medium.

The resulting polymerization reaction solution was centrifuged to precipitate the polymer particles, and the supernatant was removed. A washing operation of re-dispersing the precipitate in acetonitrile having the same mass as the polymerization reaction solution, centrifuging to precipitate the polymer particles and removing the supernatant was then repeated twice. The precipitate was collected and dried for 3 hours at 80° C. under reduced pressure to remove volatile components and obtain a powder of the carboxyl group-containing polymer salt R-1. Because the carboxyl group-containing polymer salt R-1 is hygroscopic, it was stored sealed in a container having water vapor barrier properties. When the carboxyl group-containing polymer salt R-1 was subjected to IR measurement to determine the degree of neutralization based on the intensity ratio of a peak derived from C═O groups of the carboxylic acid and a peak derived from C═O groups of the carboxylic acid Li salt, the value was 90 mol %, equal to the value calculated from the preparation.

The degree of water swelling was 63.4, and the sol fraction was 30 mass %.

Manufacturing Examples 2 to 14 and Comparative Manufacturing Example 1: Manufacture of Carboxyl Group-Containing Polymer Salts R-2 to R-15

Polymerization reaction solutions containing carboxyl group-containing polymer salts R-2 to R-15 were obtained by the same operations as in the Manufacturing Example 1 except that the charged amounts of the materials were as shown in Table 1.

Next, each polymerization reaction solution was subjected to the same operations as in Manufacturing Example 1 to obtain carboxyl group-containing polymer salts R-2 to R-15 in powder form. Each carboxyl group-containing polymer salt was stored sealed in a container having water vapor barrier properties.

The physical properties of each of the resulting polymer salts were measured as in Manufacturing Example 1, with the results shown in Table 1.

TABLE 1

| | | | Manufacturing Example/Comparative Manufacturing Example No. | | | | | | | |
|---|---|---|---|---|---|---|---|---|---|---|
| | | | ME 1 | ME 2 | ME 3 | ME 4 | ME 5 | ME 6 | ME 7 | ME 8 |
| Carboxyl group-containing polymer (salt) | | | R-1 | R-2 | R-3 | R-4 | R-5 | R-6 | R-7 | R-8 |
| Charged [parts] | Monomer | AA | 90.0 | 90.0 | 90.0 | 90.0 | 90.0 | 90.0 | 99.7 | 99.0 |
| | | CEAA | 10.0 | 10.0 | 10.0 | 10.0 | 10.0 | 10.0 | 0.3 | 1.0 |
| | | CEAO | | | | | | | | |
| | | HEA | | | | | | | | |
| | Crosslinkable monomer | T-20 | 0.2 | 0.9 | 2.0 | 3.5 | | 0.9 | 0.9 | 0.9 |
| | | P-30 | | | | | 0.6 | | | |
| | | Amt (mol %) | 0.07 | 0.32 | 0.70 | 1.22 | 0.18 | 0.32 | 0.30 | 0.30 |
| | Basic compound | TEA (mol %) | 1.0 | 1.0 | 1.0 | 1.0 | 1.0 | 1.0 | 1.0 | 1.0 |
| | Polymerization solvent | Deion. Water | 2.20 | 2.20 | 2.20 | 2.20 | 2.20 | 2.20 | 2.20 | 2.20 |
| | | AcN | 567 | 567 | 567 | 567 | 567 | 567 | 567 | 567 |
| | Polymerization initiator | V-65 | 0.040 | 0.040 | 0.040 | 0.040 | 0.040 | 0.040 | 0.040 | 0.040 |
| | Process neutralization | LiOH·$H_2O$ | 49.8 | 49.8 | 49.8 | 49.8 | 49.8 | 38.7 | 52.3 | 52.1 |
| | | $Na_2CO_3$ | | | | | | | | |
| | | $K_2CO_3$ | | | | | | | | |

TABLE 1-continued

|  | | | | | | | | |
|---|---|---|---|---|---|---|---|---|
| Initial monomer concentration [wt %] | 15% | 15% | 15% | 15% | 15% | 15% | 15% | 15% |
| Neutralized salt — Type | Li | Li | Li | Li | Li | Li | Li | Li |
| Neutralized salt — Degree of neutralization | 90.0% | 90.0% | 90.0% | 90.0% | 90.0% | 70.0% | 90.0% | 90.0% |
| Degree of water swelling | 63.4 | 30.5 | 19.8 | 10.4 | 28.6 | 38.5 | 33.4 | 31.8 |
| Sol fraction (%) | 30 | 15 | 10 | 7 | 14 | 15 | 14 | 14 |

| | | | Manufacturing Example/Comparative Manufacturing Example No. | | | | | | |
|---|---|---|---|---|---|---|---|---|---|
| | | | ME 9 | ME 10 | ME 11 | ME 12 | ME 13 | ME 14 | CME 1 |
| Carboxyl group-containing polymer (salt) | | | R-9 | R-10 | R-11 | R-12 | R-13 | R-14 | R-15 |
| Charged [parts] | Monomer | AA | 97.0 | 85.0 | 90.0 | 50.0 | 90.0 | 90.0 | 100.0 |
| | | CEAA | 3.0 | 15.0 | | | 10.0 | 10.0 | |
| | | CEAO | | | 10.0 | | | | |
| | | HEA | | | | 40.0 | | | |
| | Crosslinkable monomer | T-20 | 0.9 | 0.9 | 0.9 | 0.9 | 0.9 | 0.9 | 0.9 |
| | | P-30 | | | | | | | |
| | | Amt (mol %) | 0.31 | 0.33 | 0.32 | 0.38 | 0.32 | 0.32 | 0.30 |
| | Basic compound | TEA (mol %) | 1.0 | 1.0 | 1.0 | 1.0 | 1.0 | 1.0 | 1.0 |
| | Polymerization solvent | Deion. Water | 2.20 | 2.20 | 2.20 | 2.20 | 2.20 | 2.20 | 2.20 |
| | | AcN | 567 | 567 | 567 | 567 | 567 | 567 | 567 |
| | Polymerization initiator | V-65 | 0.040 | 0.040 | 0.040 | 0.040 | 0.040 | 0.040 | 0.040 |
| | Process neutralization | LiOH·$H_2O$ | 51.6 | 48.5 | 49.4 | 28.8 | | | 52.4 |
| | | $Na_2CO_3$ | | | | | 60.2 | | |
| | | $K_2CO_3$ | | | | | | 78.1 | |
| Initial monomer concentration [wt %] | | | 15% | 15% | 15% | 15% | 15% | 15% | 15% |
| Neutralized salt — Type | | | Li | Li | Li | Li | Na | K | Li |
| Neutralized salt — Degree of neutralization | | | 90.0% | 90.0% | 90.0% | 90.0% | 90.0% | 90.0% | 90.0% |
| Degree of water swelling | | | 30.9 | 31.2 | 30 | 4.6 | 29.4 | 29.7 | 31.2 |
| Sol fraction (%) | | | 15 | 14 | 15 | 5 | 13 | 15 | 14 |

The details of the compounds used in Table 1 are as follows.

AA: Acrylic acid (purity at least 99.9 mass %, content of monomer represented by general formula (1)=<0.1 mass %)

CEAA: Beta-carboxyethyl acrylate (SIGMA-ALDRICH, product name "2-carboxyethyl acrylate")

CEAO: Beta-carboxyethyl acrylate, n=1 to 3 (SIGMA-ALDRICH, product name 2-carboxyethyl acrylate oligomers)

HEA: 2-hydroxyethyl acrylate

T-20: Trimethylol propane diallyl ether (Daiso, "Neoallyl T-20")

P-30: Pentaerythritol triallyl ether (Daiso, "Neoallyl P-30")

TEA: Triethylamine

AcN: Acetonitrile

V-65: 2,2'-azobis (2,4-dimethylvaleronitrile (Wako Pure Chemical)

LiOH·$H_2O$: Lithium hydroxide monohydrate $Na_2CO_3$: Sodium carbonate $K_2CO_3$: Potassium carbonate Example 1

A battery was prepared using the carboxyl group-containing polymer salt R-1 and evaluated. The specific procedures, evaluation methods and the like are explained below.

(Preparing Electrode Mixture Layer Composition (Electrode Slurry))

$SiO_x$ (0.8<x<1.2) surface coated with carbon by CVD was prepared (hereunder called the "Si active material"), and a mixture of graphite (manufactured by Nippon Graphite, product name "CGB-10") and the Si active material was used as the active material. Using water as the dilution solvent, these were thoroughly pre-mixed to a mass ratio of graphite:Si active material:R-1=90:10:2.8 (as solids) so as to give the electrode mixture layer composition a solids concentration of 45 mass %, after which deionized water was added and the mixture was pre-dispersed in a Disper and then dispersed for 15 seconds at a peripheral speed of 20 m/sec in a thin-film spin mixer (Primix FM-56-30) to obtain an electrode mixture layer composition in slurry form (electrode slurry). The slurry viscosity of the electrode mixture layer compositions using each of the carboxyl group-containing polymer salts as binders and the peeling strength between the formed mixture layer and the collector (that is, the binding ability of the binder) were then measured.

<Measuring Electrode Slurry Viscosity>

The viscosity of the electrode slurry obtained above was found to be 9,700 mPa·s when measured with an Anton Paar rheometer (Physica MCR301) on a CP25-5 cone plate (diameter 25 mm, cone angle 5°) with a shearing speed of 60 $s^{-1}$ at 25° C.

Next, the electrode slurry was coated with a variable applicator onto a 12 micron-thick copper foil and dried for 15 minutes at 100° C. in a ventilation drier to form a mixture layer. The mixture layer was then pressed to a thickness of 50 f 5 microns and a packing density of 1.60 f 0.10 g/$cm^3$ to obtain a negative electrode plate.

<90° C. Peeling Strength (Binding Ability)>

The mixture layer surface of the negative electrode plate with an area of 100 mm×25 mm was affixed with double-sided tape (NICHIBAN Nice Tack NW-20) to a 120 mm×30 mm acrylic plate to prepare a sample for the peeling test. This was dried overnight at 60° C. under reduced pressure and peeled at 90° at a tensile speed of 50 mm/minute at a measurement temperature of 25° C. with a tensile tester (ORIENTEC Tensilon universal tester RTE-1210) to measure the peeling strength between the mixture layer and the copper foil and evaluate binding ability. The peeling strength was high at 11.4 N/m, a good result.

Examples 2 to 14 and Comparative Example 1

Negative electrode mixture layer compositions were prepared by the same operations as in Example 1 except that the carboxyl group-containing polymer salts used as binders were as shown in Table 2. The slurry viscosity and 90° peeling strength of each negative electrode mixture layer composition was evaluated, with the results shown in Table 2.

TABLE 2

| Example/Comparative Example No. | | | | Ex 1 | Ex 2 | Ex 3 | Ex 4 | Ex 5 | Ex 6 | Ex 7 | Ex 8 |
|---|---|---|---|---|---|---|---|---|---|---|---|
| Electrode mixture layer composition | Active material | Graphite | | 90 | 90 | 90 | 90 | 90 | 90 | 90 | 90 |
| | | Si active material | | 10 | 10 | 10 | 10 | 10 | 10 | 10 | 10 |
| | Binder | Carboxyl group-containing polymer (salt) | type | R-1 | R-2 | R-3 | R-4 | R-5 | R-6 | R-7 | R-8 |
| | | | parts | 2.8 | 2.8 | 2.8 | 2.8 | 2.8 | 2.8 | 2.8 | 2.8 |
| Evaluation results | | Electrode slurry viscosity (mPa · s) | | 9,700 | 4,300 | 2,500 | 1,400 | 3,800 | 5,800 | 8,500 | 6,400 |
| | | Peeling strength (N/m) | | 11.4 | 12.4 | 11.6 | 10.8 | 12.6 | 11.8 | 11.0 | 11.6 |

| Example/Comparative Example No. | | | | Ex 9 | Ex 10 | Ex 11 | Ex 12 | Ex 13 | Ex 14 | CE 1 |
|---|---|---|---|---|---|---|---|---|---|---|
| Electrode mixture layer composition | Active material | Graphite | | 90 | 90 | 90 | 90 | 90 | 90 | 90 |
| | | Si active material | | 10 | 10 | 10 | 10 | 10 | 10 | 10 |
| | Binder | Carboxyl group-containing polymer (salt) | type | R-9 | R-10 | R-11 | R-12 | R-13 | R-14 | R-15 |
| | | | parts | 2.8 | 2.8 | 2.8 | 2.8 | 2.8 | 2.8 | 2.8 |
| Evaluation results | | Electrode slurry viscosity (mPa · s) | | 5,000 | 3,600 | 3,800 | 600 | 3,100 | 2,800 | 19,800 |
| | | Peeling strength (N/m) | | 11.8 | 12.2 | 12.6 | 13.6 | 12.8 | 13.2 | 9.6 |

As shown by the results in Examples 1 to 14, an electrode slurry containing the secondary battery electrode binder of the present invention has low viscosity, and the peeling strength between the mixture layer of the resulting electrode and a collector was high in all cases, indicating excellent binding ability.

By contrast, using a polymer salt containing no structural units derived from a monomer represented by general formula (1) (Comparative Example 1), the electrode slurry was more viscous than in the Examples, and the peeling strength between the mixture layer of the resulting electrode and the collector was comparatively low.

INDUSTRIAL APPLICABILITY

The secondary battery electrode binder of the present invention can demonstrate better binding ability than in the past while also making it possible to reduce electrode slurry viscosity even when the electrode mixture layer composition contains a high concentration of an active material. Consequently, a secondary battery provided with an electrode obtained using this binder is expected to have good durability (cycle characteristics) and should be applicable to secondary batteries for automotive use. It is also useful when using active materials containing silicon and is expected to contribute to higher capacity batteries.

The secondary battery electrode binder of the present invention can be used favorably in non-aqueous electrolyte secondary battery electrodes in particularly and is especially useful for non-aqueous electrolyte lithium-ion secondary batteries having high energy densities.

The invention claimed is:
1. A secondary battery electrode binder comprising a carboxyl group-containing polymer or salt thereof, wherein the carboxyl group-containing polymer or salt thereof contains a structural unit derived from a monomer represented by general formula (1) and a structural unit derived from an ethylenically unsaturated carboxylic acid monomer not represented by general formula (1), the structural unit derived from the monomer represented by general formula (1) is contained in an amount of from 0.1 mass % to 20 mass % of total structural units of the carboxyl group-containing polymer or salt thereof, and the structural unit derived from an ethylenically unsaturated carboxylic acid monomer not represented by general formula (1) is contained in an amount of from 50 mass % to 99.9 mass % of the total structural units of the carboxyl group-containing polymer or salt thereof:

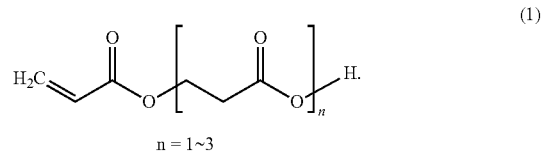

n = 1~3

2. The secondary battery electrode binder according to claim 1, wherein the carboxyl group-containing polymer is a crosslinked polymer obtained by polymerizing a monomer composition containing a non-crosslinkable monomer and a crosslinkable monomer.

3. The secondary battery electrode binder according to claim 2, wherein the crosslinkable monomer is used in an amount of from 0.1 mol % to 1.0 mol % of a total amount of the non-crosslinkable monomer.

4. The secondary battery electrode binder according to claim 3, wherein a degree of water swelling of the crosslinked polymer at pH 8 is from 4.0 to 60.

5. The secondary battery electrode binder according to claim 3, wherein the crosslinked polymer contains a compound having at least two allyl ether groups in the molecule.

6. The secondary battery electrode binder according to claim 2, wherein a sol fraction of the crosslinked polymer is less than 40 mass %.

7. The secondary battery electrode binder according to claim 6, wherein a degree of water swelling of the crosslinked polymer at pH 8 is from 4.0 to 60.

8. The secondary battery electrode binder according to claim 6, wherein the crosslinked polymer contains a compound having at least two allyl ether groups in the molecule.

9. The secondary battery electrode binder according to claim 2, wherein a degree of water swelling of the crosslinked polymer at pH 8 is from 4.0 to 60.

10. The secondary battery electrode binder according to claim 2, wherein the crosslinked polymer contains a compound having at least two allyl ether groups in the molecule.

11. The secondary battery electrode binder according to claim 1, wherein the ethylenically unsaturated carboxylic acid monomer not represented by general formula (1) contains non-esterified mono- or dicarboxylic acid.

12. The secondary battery electrode binder according to claim 11, wherein the ethylenically unsaturated carboxylic acid monomer not represented by general formula (1) contains one or more monomers selected from the group consisting of (meth)acrylic acid, itaconic acid, crotonic acid, maleic acid, and fumaric acid.

13. The secondary battery electrode binder according to claim 11, wherein the ethylenically unsaturated carboxylic acid monomer not represented by general formula (1) contains acrylic acid.

14. A secondary battery electrode mixture layer composition, comprising the secondary battery electrode binder according to claim 1 together with an active material and water.

15. A secondary battery electrode comprising an electrode mixture layer including the secondary battery electrode binder according to claim 1 on a surface of a collector.

16. A secondary battery comprising the secondary battery electrode according to claim 15.

* * * * *